United States Patent [19]

Schwefel et al.

[11] Patent Number: 4,760,280
[45] Date of Patent: Jul. 26, 1988

[54] PROCESS AND APPARATUS FOR THE SYNCHRONIZATION OF SQUARE SIGNALS

[75] Inventors: Ernst Schwefel, Traunreut; Martin Huber, Asten; Alois Zimmermann, Bussdorf-Sondermoning, all of Fed. Rep. of Germany

[73] Assignee: Dr. Johannes Heidenhain GmbH, Traunreut, Fed. Rep. of Germany

[21] Appl. No.: 875,559

[22] Filed: Jun. 18, 1986

[30] Foreign Application Priority Data

Jul. 2, 1985 [DE] Fed. Rep. of Germany ....... 3523551

[51] Int. Cl.⁴ .......................... H03K 17/16; H03K 19/3
[52] U.S. Cl. ..................... 307/269; 307/262; 328/63; 328/72; 328/74
[58] Field of Search ........................ 328/63, 72, 74, 75; 307/269, 262

[56] References Cited

U.S. PATENT DOCUMENTS 3,603,810  9/1971  Clayson .................................. 328/75
4,017,802  4/1977  Ferrarin ................................ 328/130
4,096,396  6/1978  Belforte et al. ..................... 307/269
4,587,445  5/1986  Kanuma ............................... 307/443

FOREIGN PATENT DOCUMENTS 407569  8/1966  Switzerland .

OTHER PUBLICATIONS

Patents Abstracts of Japan, E-272, Oct. 17, 1984, vol. 8/No. 226.

Primary Examiner—Stanley D. Miller
Assistant Examiner—Richard Roseen
Attorney, Agent, or Firm—Willian Brinks Olds Hofer Gilson & Lione Ltd.

[57] ABSTRACT

A process and apparatus for improving the resolution of square, subdivided signals by synchronizing the signals with an auxiliary clock signal. The signals are further conditioned by switching logic elements which, in dependence upon adjacent signals in the subdivision order and upon the auxiliary clock signal, only allow the states of the signals to change at predefined times.

12 Claims, 4 Drawing Sheets

PROCESS AND APPARATUS FOR THE SYNCHRONIZATION OF SQUARE SIGNALS

BACKGROUND OF THE INVENTION

The present invention relates to an apparatus and process for the synchronization of a plurality of square, subdivided signals wherein the signals are of the type produced by subdividing an analog periodic scanning signal generated by a scanning unit during the scanning of a measuring graduation.

It is well known in incremental length or angle measuring systems that periodic analog signals are generated by a scanning unit in the process of scanning a grid-type incremental measuring graduation. To determine the direction of movement and to avoid the occurrence of symmetry errors in the scanning signals, the scanning operation is often performed with four scanning fields wherein each field is offset to one another in the measuring direction by a quarter of the grid graduation period.

For many measurement applications, the resolution corresponding to the grid graduation is not sufficient. A large number of proposals have been made to subdivide the scanning signals and to thereby increase the resolution of the measurement.

In Swiss Pat. No. 407,569, a subdivision circuit is disclosed wherein a plurality of trigger circuits are used to subdivide and thereby increase the number of the scanning signals. However, the circuit described in this publication offers no assurance that, with increasingly finer subdivisions, the trigger signals are precisely synchronized with respect to their sequence and edge spacing. Without precise synchronization, inaccurate counting in the incremental evaluation of the square signals may occur. The inaccuracy of the count may be dependent upon the degree of subdivision, the measuring speed, and interfering influences of an electrical and mechanical nature, including interference pulses, jarrings, and the like.

In addition, excessively small edge spacings, overlappings or inadmissible signal states or sequences of the trigger signals may occur with increasingly finer subdivisions. All of these conditions may lead to a reduction in measuring accuracy.

During relative movement of the measuring instrument and the measured object, the inaccuracy of the countings may not be perceptible. The imperceptibility may arise because the least significant digits of the evaluating unit display are undergoing such a rapid change in their displayed values that they are unreadable. However, when relative movement of the measuring system and the measured object ceases, the entire display value is readable. It is then important that the measuring system provide assurance that all the graduation increments and all the square signals produced by subdivision have in fact been counted. The sum, or, in the case of a negative measuring direction, the difference, of all the increments traversed must correspond exactly to the display value. It is this value that represents the measure of the path traversed.

If the square signals that have been obtained from the scanning signals by subdivision have such a small edge spacing that an accurate counting is not possible, then all of the square signals may not be counted. An inaccurate counting results in a measurement value being displayed in the evaluating unit which is lower than the value which actually represents the travel of the measuring apparatus.

The other conditions cited above which produce faulty measuring signals may also lead to similar inaccurate measurement results.

It is an object of the present invention to provide an apparatus and process for synchronizing the triggered square signals to the excessively small edge spacings of the successive subdivided, square signals and for correcting faulty transition states of the square signals.

SUMMARY OF THE INVENTION

The present invention is directed to an apparatus and process for synchronizing a plurality of square, subdivided signals.

According to the present invention, an apparatus and process provide for the synchronization of a plurality of square signals wherein the square signals are of the type generated from at least one periodic analog signal. The analog signal is of the type produced by a scanning unit when scanning an incremental measuring graduation and is subdivided into a plurality of signals wherein the subdivision defines an order. The subdivided signals are squared and the process and apparatus provide for the sequencing of the square signals in time with at least one periodic auxiliary signal. The sequencing is performed in dependence upon the signal states of the auxiliary signal and upon the signal states of the adjacent signals in the subdivision order.

One advantage of the present invention is that the correct switching sequence of the square signals is provided by the inclusion of the switching states of the adjacent square signals in the sequencing process.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENT

Figure 1:
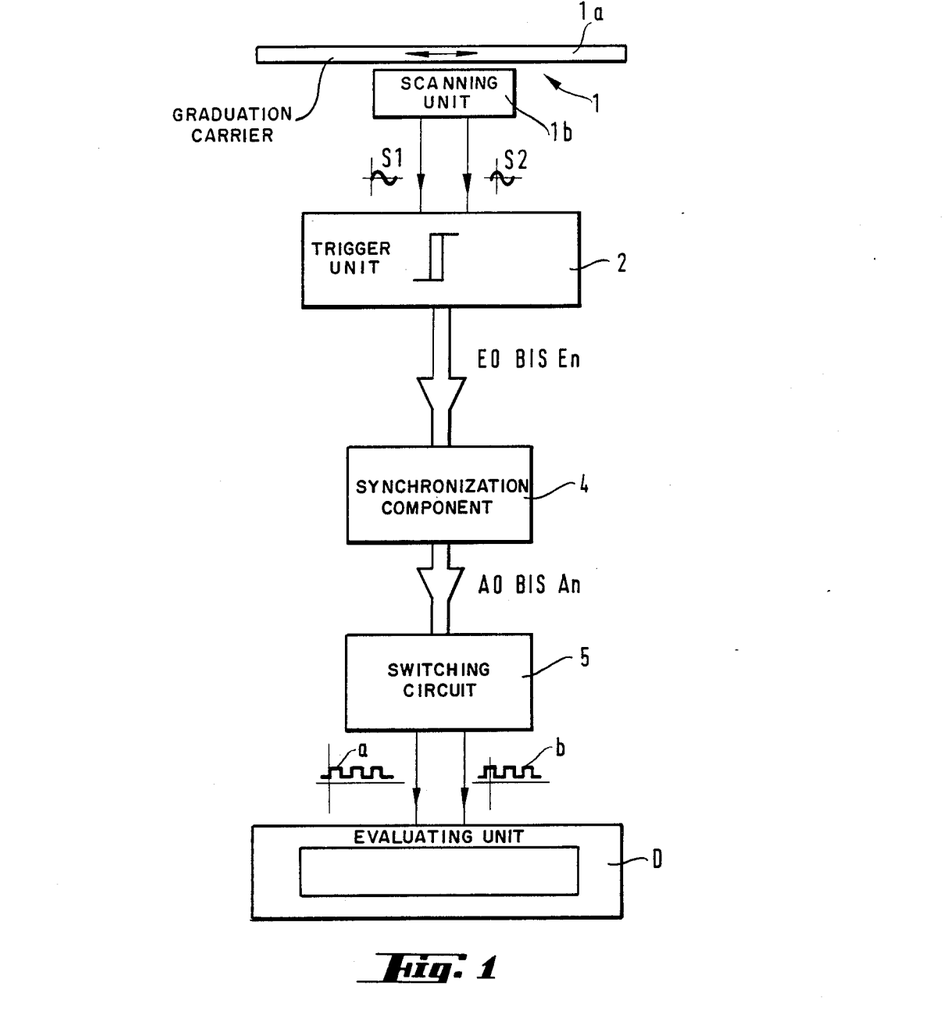
FIG. 1 is a schematic representation of a length measuring unit connected with an evaluating unit.

In reference to the drawings, FIG. 1 shows an incremental measuring arrangement 1 comprising a measuring graduation carrier 1a. The measuring carrier 1a is scanned by a scanning unit 1b during relative movement of the carrier 1a and the scanning unit 1b. As a result of the scanning, two sinusoidal analog measuring signals S1, S2 are generated which are offset from one another by 90°. The measuring signals S1, S2 are applied to a trigger unit 2 whereupon the signals S1, S2 are subdivided by a number of trigger circuits, not shown, and transformed into a sequence of square signals R0 to Rn.

Figure 2:
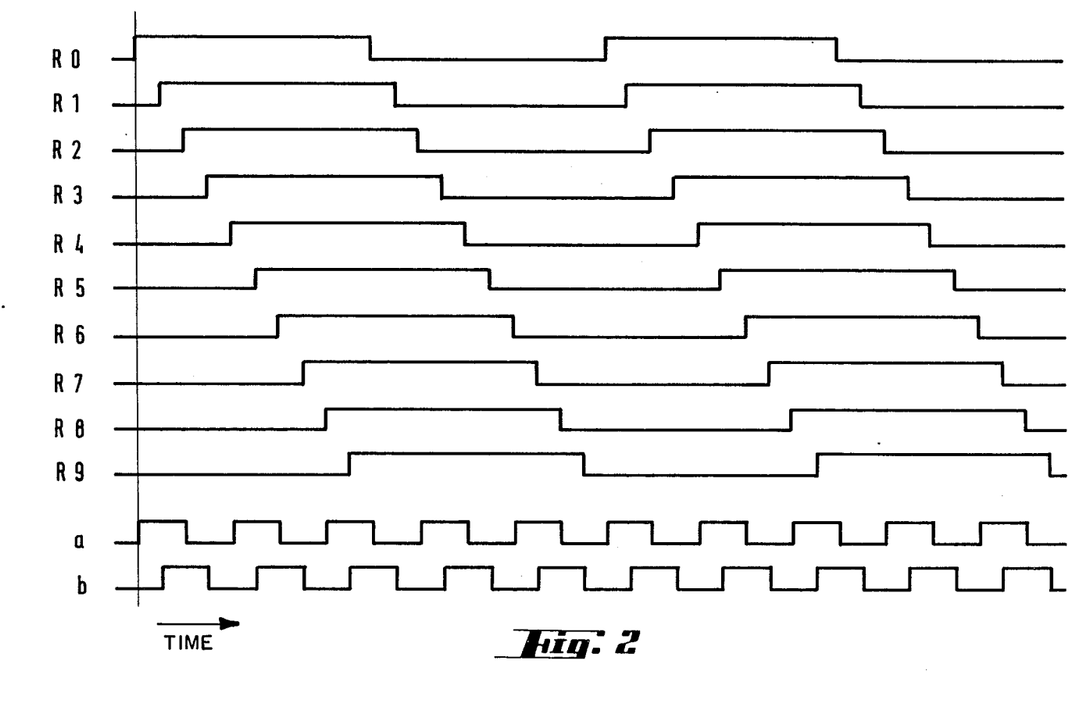
FIG. 2 is a signal state diagram of square signal sequences.

A corresponding signal diagram, FIG. 2, shows the square signal sequences R0 to R9 which are obtained by triggering at a spacing of 18°. The spacing corresponds to a fivefold subdivision. This degree of subdivision requires ten trigger circuits since in the triggering there are evaluated both the 0° measuring signal S1 and the 90° measuring signal S2. Ideally, the ten square signals R0 to R9 follow and are offset with respect to one another by 18°. If, however, the resolution is to be multiplied by a factor of ten, the measuring signals S1, S2 would have to be triggered at a spacing of 9°.

If the sequence of the square signals R0 to R9 is undisturbed, measurement inaccuracies may not occur. In such a case, the evaluating arrangement D could correctly process and display the measurement values after the square signals R0 to R9 are summed in the switching circuit 5.

However, in actual practice, the disturbances in the square signals increase with the degree of subdivision. The process and apparatus of the present invention may be used to correctly sequence the triggered square signals R0 to Rn to prevent the measurement inaccuracies described above. The apparatus is located, and the corresponding application of the process occurs, in the synchronization component 4.

Figure 3:
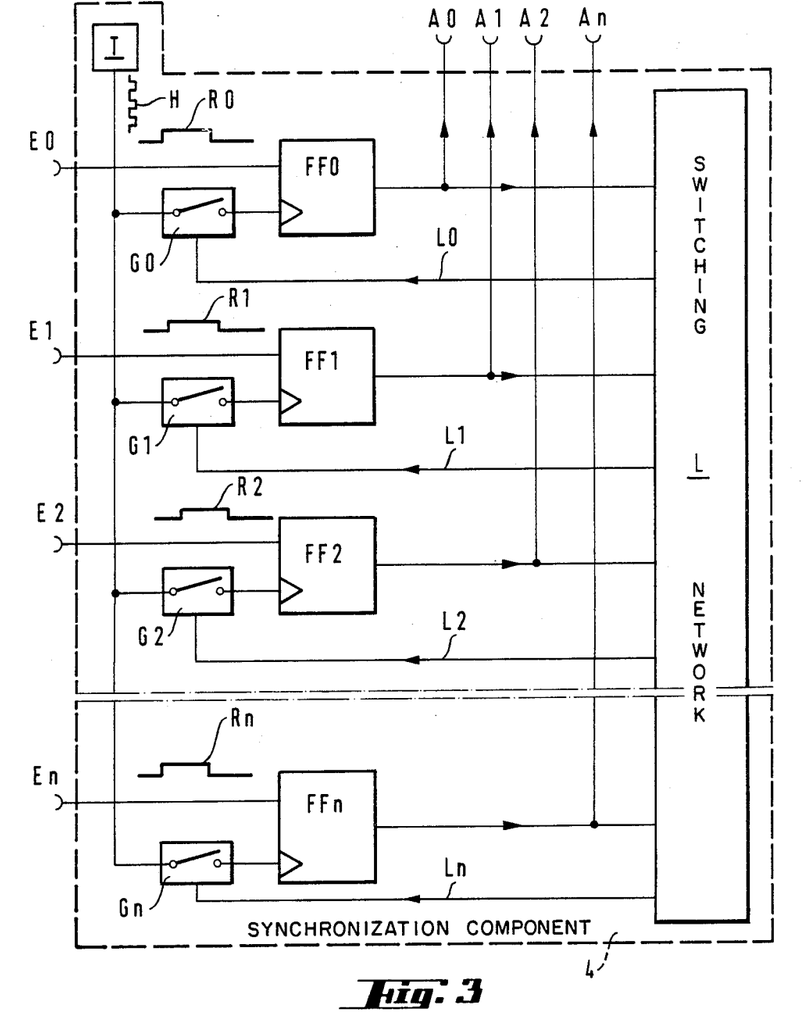
FIG. 3 is an abstract block representation of the preferred embodiment of the present invention for the synchronization of the signals.

The synchronization component 4 is abstractly represented in the block circuit diagram of FIG. 3. The synchronization component 4 comprises a clock generator T, a plurality of bistable toggle circuits FF0 to FFn and a plurality of switching means G0 to Gn. The clock generator T is connected to the clock inputs of the bistable toggle circuits FF0 to FFn by means of the switching means G0 to Gn. The toggle circuits FF0 to FFn comprise, in addition to the clock inputs, respective data inputs E0 to En and respective data outputs A0 to An. The data outputs A0 to An of the toggle circuits FF0 to FFn are applied to a switching network L which is constructed in the form of a combinatorial network.

The switching network L comprises outputs L0 to Ln. The signal states of the outputs L0 to Ln are determined by a combination of the signal states which are applied to the inputs of the switching network L. The outputs L0 to Ln are then applied to the switching means G0 to Gn.

The clock generator T produces an auxiliary signal H of a preselected frequency. The frequency is chosen such that the duration of a clock period is not greater than the duration between two successive square signals. The signal H is applied by means of the switching means G0 to Gn to the respective clock inputs of the toggle circuits FF0 to FFn in dependence upon the signal states of the outputs L0 to Ln.

In general, this circuitry allows the input signal of a given toggle circuit FFi to be switched through to the output when the clock input of the given circuit FFi is enabled by the output signal states of the adjacent toggle circuits FF(i−1), FF(i+1).

Within each cycle of the system clock, only one output A0 to An can change state due to the synchronization with the system clock and the above described switching logic. This results in the output A0 to An being switched in correct sequence independently, within certain limits, of the changes in the states of the inputs E0 to En.

Figure 4:
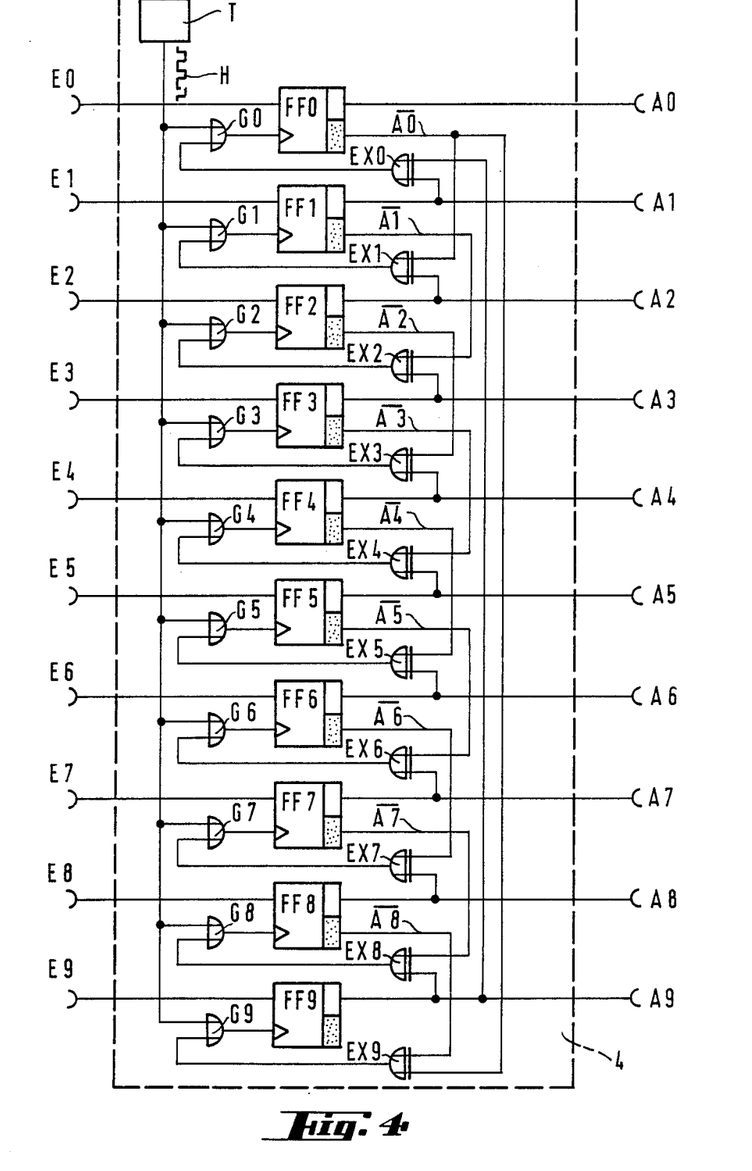
FIG. 4 is a detailed block representation of the preferred embodiment of the present invention for the synchronization of the signals.

A more detailed circuit for performing the process of the present invention is shown in FIG. 4. The circuit is generally represented as synchronization component 4.

The triggered square signals R0 to R9, previously shown in FIG. 2, are applied to respective data inputs E0 to E9 of the respective bistable toggle circuits FF0 to FF9. The clock generator T generates an auxiliary signal H which is applied to the clock inputs of the toggle circuits FF0 to FF9. by means of the logic elements G0 to G9. Each logic element G0 to G9 comprises an OR-gate. The OR-gates G0 to G9 are operative to control the respective clock inputs of the individual toggle circuits FF0 to FF9.

The square signals which are synchronized by the synchronization component 4 are produced on respective outputs A0 to A9 of the bistable toggle circuits FF0 to FF9. Special linkage conditions are necessary for the synchronization of the first and last square signals. These special linkage conditions are explained in detail below.

As mentioned, the auxiliary signal H of the clock generator T is applied to one input of each OR-gate G1 to G9. Thus, the clock inputs for the activation of the bistable toggle circuits FF1 to FF9 are controlled by respective ones of the OR-gates G1 to G9.

However, the controlling activity of a particular OR-gate G1 to G9 is dependent upon the timed auxiliary signal H and on the signal states of the outputs of respective ones of the exclusive OR-gates EX1 to EX9.

The signal states of the outputs of the exclusive OR-gates EX0 to EXG are in each case dependent upon the states of the signals applied to their inputs. The inverted output signal A(i−1) of each preceding toggle circuit FF(i−1) is applied to one input of the respective exclusive OR-gates EX1 to EX8. The noninverting output signal A(i+1) of each succeeding toggle stage FF(i+1) is applied to the other input of the respective exclusive OR-gates EX1 to EX8.

The switching characteristics of the toggle circuits FFi will now be explained in detail with respect to one of the circuits. The square signal R4 is applied to the data input E4 of the toggle circuit FF4. The signal on the input E4 is switched through to the output A4 of the toggle stage FF4 when a triggering edge of the auxiliary signal H is applied to the clock input of the toggle circuit FF4. The triggering edge of the auxiliary signal H is applied to the clock input of the toggle circuit FF4 only if the auxiliary signal H can pass through the OR-gate G4. For this to happen, it is necessary for the input of the OR-gate G4, which is connected with the exclusive OR-gate EX4, to be in the logical "0" state. Thus, the auxiliary signal H of the clock generator T is applied to one input of the OR-gate G4 and the output of the exclusive OR-gate EX4 is applied to the other input of the OR-gate G4. Additionally, one input of the exclusive OR-gate EX4 is connected to the inverted output A3 of the preceding toggle circuit FF3. The other input of the exclusive OR-gate EX4 is connected to the noninverted output A5 of the succeeding toggle circuit FF5.

In order for the auxiliary signal H of the clock generator T to switch through the square signal R4 onto the output A4 of the toggle circuit FF4, both inputs of the exclusive OR-gate EX4 must have the same logical state. Thus, both signals must be in a logical "0" or a logical "1" state. When this condition is met, the output of the exclusive OR-gate EX4 will be in the logical "0" state and the auxiliary signal H of the clock generator T will be allowed to pass through the OR-gate G4. The triggering edge of the auxiliary signal H will thereupon enable the toggle circuit FF4 to pass the square signal R4 onto the output A4.

In this manner, the state of an output signal of the toggle circuit is allowed to change in dependence upon the signal state of the neighboring synchronized square signals of the outputs A(i−1) and A(i+1). The changes occur in further dependence upon the clocking of the auxiliary signal H. This dependence results in the synchronization of the output signals Ai.

To ensure proper synchronization of the square signals from one signal period of the subdivided analog measuring signal to the next, the first and last toggle circuits FF0 and FF9 must be switched slightly differently. The switching of these circuits is controlled by the exclusive OR-gates EX0 and EX9. The difference in switching arises due to the fact that toggle circuits FF0 and FF9 have in each case only one neighboring toggle circuit FF1 and FF8, respectively. As shown in FIG. 4, the exclusive OR-gate EX0, associated with the first toggle circuit FF0, is controlled by the noninverted output A1 of the toggle circuit FF1 and by the noninverted output A9 of the last toggle circuit FF9. Correspondingly, the exclusive OR-gate EX9 of the last toggle circuit FF9 is controlled by the inverted output A8-bar of the preceding toggle circuit FF8 and with the inverted output A0-bar of the first toggle circuit FF0.

The square signals R0 to R9, after being synchronized in the synchronization component 4, are fed over the outputs A0 to A9 into the switching circuit 5, where they are summed. The summed square signals R0 to R9 are represented as square signals a, b in FIG. 2. The square signals a, b are then applied to the evaluating unit D where they are displayed as counted measurement values.

The foregoing detailed description has been given for illustrative purposes only. A wide range of changes and modifications can be made to the preferred embodiment described above. For example, it should be obvious that the process of the invention for the synchronization of square signals is not restricted to length measuring systems. Further, one skilled in the art could provide other logic switching elements according to the rules of Boolean algebra to produce other embodiments of this invention. In addition, it should be understood that the switching means may be connected to the data inputs of the toggle circuits to control application of the square signals rather than to the clock inputs to control application of the clock signals. The clock signal could then be applied to the clock inputs directly, if desired. It should therefore be understood that it is the following claims, including all equivalents, which are intended to define the scope of this invention.

We claim:

1. A process for the synchronization of a plurality of square signals, the square signals of the type generated from at least one periodic analog signal produced by a scanning unit scanning an incremental measuring graduation, wherein the analog signal is subdivided into a plurality of signals, the subdivision defining a subdivision order of the subdivided signals, each subdivided signal being squared, the process comprising:
   applying each square signal to an input of a respective toggle circuit; and
   enabling each toggle circuit to output a signal representative of the respective input signal in dependence upon (1) an auxiliary periodic signal; and (2) the output of toggle circuits adjacent in the subdivision order such that the output of each toggle circuit is initiated in synchronized sequence.

2. An aparatus for the synchronization of a plurality of square signals, the square signals of the type generated by subdividing and squaring at least one analog signal generated by a scanning unit scanning an incremental measurnig graduation, the subdivision defining a subdivision order such that the first in the order is adjacent and succeeding to the last in the order, the apparatus comprising:
   a plurality of outputs;
   means for applying each square signal to a respective output in dependence upon (1) at least one auxiliary periodic signal; and (2) the state of output lines adjacent in the subdivision order.

3. An apparatus for the synchronizaton of square signals, the square signals of the type generated from at least one periodic analog signal produced by a scanning unit scanning an incremental measuring graduation, wherein the analog signal is subdivided and squared to produce a plurality of square signals, the subdivision defining a subdivision order of a circular nature such that the last in the order is adjacent and preceding to the first in the order, the apparatus comprising:
   a plurality of bistable toggle circuits, each toggle circuit comprising a data input, a clock input and an output, a respective one of the square signals applicable to the data input;
   at least one clock generator operative to generate a clock signal and comprising an output, the clock signal applicable to the clock input of each toggle circuit;
   a plurality of switchng means, each switching means associated with a respective one of the toggle circuits and connected to one of the data and clock inputs to control the application of one of the square and clock signals to the respective toggle circuit; and
   a combinatorial logic network comprising a plurality of inputs connected to the togle circuit outputs, the network connected to control each switching means and operative such that control of each switching means is dependent on the state of the inputs of the combinatorial logic network.

4. The apparatus of claim 3 wherein the clock signal is provided by a common clock generator and wherein each switching means is disposed on the clock input of the respective one of the toggle circuits to control the application of the clock signal.

5. The apparatus of claim 3 wherein each stitching means comprises means for generating the logical OR of the respective square signal and the clock signal.

6. The apparatus of claim 4 wherein each switching means comprises means for generating the logical OR of the respective square signal and the clock signal.

7. The apparatus of claim 3 wherein the combinatorial logic network comprises a plurality of exclusive OR-gate circuits, each circuit associated with a respective one of the toggle circuits and comprising an output of toggle circuits adjacent and at least two inputs, the output connected to the input of a respective one of the switching means, the inputs connected to the respective outputs in the subdivision order.

8. The apparatus of claim 4 wherein the combinatorial logic network comprises a plurality of exclusive OR-gate circuits, each circuit associated with a respective one of the toggle circuits and comprising an output and at least two inputs, the output connected to the input of a respective one of the switching means, the inputs connected to respective outputs of toggle circuits adjacent in the subdivision order.

9. The apparatus of claim 5 wherein the combinatorial logic network comprises a plurality of exclusive OR-gate circuits, each circuit associated with a respective one of the toggle circuits and comprising an output and at least two inputs, the output connected to the input of a respective one of the switching means, the inputs connected to respective outputs of toggle circuits adjacent in the subdivision order.

10. The apparatus of claim 8 wherein each exclusive OR-gate comprises a first and second input, the first input connected to the inverting output of the preceding toggle circuit and the second input connected to the noninverting output of the succeeding toggle circuit.

11. An apparatus for the synchronization of square signals, the square signals of the type generated by subdividing and squaring at least one periodic analog signal generated by a scanning unit, the subdivision defining a subdivision order in a circular manner such that the last in the order is adjacent and preceding to the first in the order, the apparatus comprising:
   a plurality of bistable toggle circuits, each toggle circuit defining a data input connected to a respective one of the square signals, a clock input and an output;
   a plurality of gating circuits, each gating circuit comprising a first input, a second input and an output, each output connected to the clock input of a respective one of the toggle circuits;
   a clock generator operative to generate a clock signal of a preselected frequency and comprising an output, the output connected to the first input of each gating circuit; and
   a logic means comprising a plurality of inputs and outputs, the logic means operative to produce at least one output whose signal state is dependent upon the signal state of at least one input, each input connected to the output of a respective one of the toggle circuits, each output connected to the second input of a respective one of the gating circuits;
   the toggle circuits, gating circuits, clock generator and logic means operative to produce signals on the toggle circuit outputs in synchronization to the clock signal and to allow a change in the signal of the toggle circuit outputs in dependence upon the signal states of the outputs of the toggle circuits adjacent in the subdivision order.

12. The invention of claim 11 wherein each toggle circuit comprises an inverted output and a noninverted output; wherein the logic means comprises a plurality of exclusive OR-gates, each exclusive OR-gate comprising a first input, a second input and an output; wherein the first input of the first exclusive OR-gate is connected to the noninverting output of the last toggle circuit and the second input of the first exclusive OR-gate is connected to the noninverting output of the succeeding toggle circuit; wherein the first input of the last exclusive OR-gate is connected to the inverting output of the preceding toggle circuit and the second input of the last exclusive OR-gate is connected to the inverting output of the first toggle circuit; wherein the first input of each of the other exclusive OR-gates is connected to the inverting output of the preceding toggle circuit and the second input of each of the other exclusive OR-gates is connected to the noninverting output of the succeeding toggle circuit; and wherein the output of each exclusive OR-gate is connected to the second input of a respective one of the gating circuits.

* * * * *

UNITED STATES PATENT AND TRADEMARK OFFICE
CERTIFICATE OF CORRECTION

PATENT NO. : 4,760,280

DATED : July 26, 1988

INVENTOR(S) : Ernst Schwefel et al.

It is certified that error appears in the above-identified patent and that said Letters Patent is hereby corrected as shown below:

IN THE DETAILED DESCRIPTION OF
THE PRESENTLY PREFERRED EMBODIMENT

In col. 4, line 1, after "FF9" please delete the period.

In col. 4, line 23, please delete "EXG" and substitute therefor --EX9--.

IN THE CLAIMS

In col. 6, line 43, please delete "stitching" and substitute therefor --switching--.

In col. 6, line 53, please delete "of toggle circuits adjacent".

In col. 6, line 55, please delete the second occurrence of "the".

In col. 6, line 56, after "outputs" please insert --of toggle circuits adjacent--.

UNITED STATES PATENT AND TRADEMARK OFFICE
CERTIFICATE OF CORRECTION

PATENT NO. : 4,760,280

DATED : July 26, 1988

INVENTOR(S) : Ernst Schwefel et al.

It is certified that error appears in the above-identified patent and that said Letters Patent is hereby corrected as shown below:

In col. 8, line 7, after the second occurrence of "signal" please insert --states--.

Signed and Sealed this

Twenty-ninth Day of May, 1990

Attest:

HARRY F. MANBECK, JR.

Attesting Officer     Commissioner of Patents and Trademarks